`US006817138B1`

United States Patent
McGill et al.

(10) Patent No.: US 6,817,138 B1
(45) Date of Patent: Nov. 16, 2004

(54) FLEXIBLE APPARATUS COVER PROVIDING ELECTRICAL SHOCK UPON CONTACT

(76) Inventors: David Taylor McGill, 43460 Via Barrozo, Temecula, CA (US) 92592; Cheryl Gay McGill, 43460 Bia Barrozo, Temecula, CA (US) 92592

( * ) Notice: Subject to any disclaimer, the term of this patent is extended or adjusted under 35 U.S.C. 154(b) by 64 days.

(21) Appl. No.: 10/728,505

(22) Filed: Dec. 5, 2003

(51) Int. Cl.[7] .......................................... A01M 19/00
(52) U.S. Cl. ........................... 43/98; 361/232; 114/361
(58) Field of Search ............................ 93/98; 361/232; 49/59; 114/361

(56) References Cited

U.S. PATENT DOCUMENTS

| | | | | |
|---|---|---|---|---|
| 1,848,625 A | * | 3/1932 | Hagar | 43/112 |
| 2,473,183 A | * | 6/1949 | Watson | 219/543 |
| 3,211,153 A | * | 10/1965 | Gambetti | 607/149 |
| 3,366,854 A | | 1/1968 | Robinson | 317/262 |
| 3,392,247 A | * | 7/1968 | Check | 200/86 R |
| 4,299,048 A | | 11/1981 | Bayes | 43/98 |
| 4,475,141 A | * | 10/1984 | Antonevich | 361/220 |
| 4,700,054 A | * | 10/1987 | Triplett et al. | 219/545 |
| 4,713,725 A | * | 12/1987 | Kroll | 361/232 |
| 4,722,354 A | * | 2/1988 | Axelgaard et al. | 607/152 |
| 4,884,062 A | * | 11/1989 | Lin et al. | 340/568.7 |
| 4,949,216 A | * | 8/1990 | Djukastein | 361/232 |
| 4,969,418 A | * | 11/1990 | Jones | 119/712 |
| 4,997,127 A | * | 3/1991 | McEwen | 231/7 |
| 5,023,433 A | * | 6/1991 | Gordon | 219/548 |
| 5,049,704 A | * | 9/1991 | Matouschek | 174/261 |
| 5,107,620 A | * | 4/1992 | Mahan | 43/112 |
| 5,158,039 A | * | 10/1992 | Clark | 119/712 |
| 5,301,678 A | * | 4/1994 | Watson et al. | 600/534 |
| 5,813,360 A | * | 9/1998 | Dickey, Jr. | 114/161 |
| 6,082,285 A | * | 7/2000 | Hinrichs | 114/343 |
| 6,341,444 B1 | * | 1/2002 | Cina et al. | 43/98 |
| 6,519,131 B1 | * | 2/2003 | Beck | 361/232 |
| 6,540,303 B2 | * | 4/2003 | Mosquera | 297/452.58 |
| 6,649,886 B1 | * | 11/2003 | Kleshchik | 219/529 |
| 2002/0092481 A1 | * | 7/2002 | Spooner | 119/908 |

* cited by examiner

*Primary Examiner*—Charles T. Jordan
*Assistant Examiner*—Jordan Lofdahl
(74) *Attorney, Agent, or Firm*—Gene Scott-Patent Law & Venture Group

(57) ABSTRACT

A flexible fabric blanket of plural layers including a bottom insulating layer, a base electrically conductive layer, a medial insulating layer, a medial electrically conductive layer, and a top insulating layer. A first set of electrically conductive stitchings extend between the medial electrically conductive layer, and the top insulating layer and are exposed on an exterior surface of the top insulating layer. A second set of electrically conductive stitchings extend between the base electrically conductive layer, and the top insulating layer and are also exposed on an exterior surface of the top insulating layer, but do not touch the medial electrically conductive layer.

9 Claims, 2 Drawing Sheets

FLEXIBLE APPARATUS COVER PROVIDING ELECTRICAL SHOCK UPON CONTACT

BACKGROUND OF THE INVENTION

1. Incorporation by Reference

Applicant(s) hereby incorporate herein by reference, any and all U.S. patents, U.S. patent applications, and other documents and printed matter cited or referred to in this application.

2. Field of the Invention

This invention relates generally to covers or blankets for machines, boats, cars and such, and more particularly to such a cover having a set of electrically conductive stitches on one side so that an electrical shock is received by an animal coming into contact with the cover.

3. Description of Related Art

The following art defines the present state of this field:

Robinson, U.S. Pat. No. 3,366,854 describes an installation for repelling birds from a roosting surface comprising: a source of electrical power; a unitary electrical cable comprising a pair of spaced apart longitudinal conductors separated by an elongated body of insulating material therebetween, the cross-sectional dimensions of said cable being such that the cable is utilizable as a perch for birds, an elongated surface on each of said conductors being free of covering insulating material to be exposed along a major portion of the length of said cable, the spacing between the exposed portions of said conductors being such as to always provide a current path primarily through a foot of a bird perched on said cable because of simultaneous contact between each conductor and apposed digits on the single foot of the bird; means for supporting said conductors in a substantially horizontal plane to promote the simultaneous contact between each conductor and apposed digits on a single foot of a bird perched on said cable; and means connecting said conductors to said power source.

Bayes, U.S. Pat. No. 4,399,048 describes an electrical device for mass exterminating of objectable pest birds, such as starlings or the like; the device including an overhead cable supported between posts, the cable carrying a plurality of spaced-apart copper electrodes along its outer side, so that, when a horde of pest birds try to land upon the wire by their toes straddling it, they close an electric circuit between the electrodes, which are connected to a power source, so that the birds are thus electrocuted.

Djukastein, U.S. Pat. No. 4,949,216 describes a device for discouraging small domestic or wild animals from frequenting areas where they may become a nuisance. The device comprises a mat made of non-conductive material to be spread over the area. A plurality of conductive surfaces are spaced on the upper surface of the mat so that adjacent conductive surfaces are electrically insulated from each other. An electric control is associated with the conductive surfaces and provides electric power thereto so that when an animal walks on the mat its body completes a circuit between live and ground areas on the mat and the animal is thereby provided with an unpleasant electrical sensation.

Jones, U.S. Pat. No. 4,969,418 describes an apparatus and method for training animals having active and passive components. The animal is trained to avoid entering an area by a mild shock which the animal received when it treads on a visible interdigital array. Eventually the animal is deterred by viewing the array alone and the shocking means is removed. The visible array can be supplemented with electroluminescent, olfactory or audio stimuli.

Dickey, Jr., U.S. Pat. No. 5,813,360 describes a vehicle cover including a sheet of flexible material for covering and protecting at least the upper portion of the vehicle, a securing band coupled with the sheet adjacent the edge thereof, and a preferred ratchet for releasably tightening the band about the periphery of the vehicle below a portion of the vehicle presenting a greater periphery. The band is sufficiently tightened to prevent slipping over the greater periphery and can be locked in the tightened position in order to prevent unauthorized intrusion into the vehicle.

Hinrichs, U.S. Pat. No. 6,082,285 describes a sea bird marine craft protector having an elevated protector net for preventing sea birds, such as sea gulls and the like, from landing on deck and superstructure of a marine craft and supports or struts for supporting and elevating the protector net above the deck and above the superstructure. The sea bird marine craft protector has fasteners for fastening the protector net to a rail on the deck and fasteners on stern of the marine craft, for pulling the protector net taut, and for maintaining the protector net at a minimum height above the deck and the superstructure. Additionally, the sea bird marine craft protector has strut support mounts, which are mounted on port deck and starboard deck of the marine craft, respectively, for supporting the struts therebetween, maintaining the struts in user selected positions, and for maintaining the minimum height of the protector net above the deck and the superstructure. The protector net is elevated to the minimum height, which is greater than the length of the longest sea bird's legs, that a user intends to protect the marine craft from. The protector net has a mesh, which is smaller than the width of the body of the smallest sea bird, that the user intends to protect the marine craft from and entering and landing therethrough. The minimum height and the mesh may vary, depending upon the user's needs. The sea bird marine craft protector may have a reel for letting out and winding up the protector net.

Beck, U.S. Pat. No. 6,519,131 describes an electric cattle guard formed of first and second elongated mats, said second mat received in an upper face of the first mat. Both mats are formed of a flexible insulating material with the second mat interspersed with electrically conductive particles, fibers or a mixture thereof in an amount sufficient to apply a high voltage, low energy shock to an animal making contact with the second elongated mat when it energized. A conductive strip adapted to make electrical contact with an electric fence energizer is provided at one or both ends of the second elongated mat.

Spooner, U.S. 2002/0092481 describes a method and apparatus for confining animals or livestock and preventing their traverse through a gate. Mats are provided having an insulated substrate holding an electrically conductive medium embedded therein. A power source supplies electrical current to the conductive medium. When the power source is activated, the mats may convey a shock to an animal. The mats are located in a gate passage so as to enable normal operation of the gate while preventing the traverse of livestock or animals within the gated area.

Dressel, EP 0377550 describes a vineyard having conductive trellis wires which extend between poles to provide support for the grape vines. At least some of the trellis wires are grounded. A number of identical bird repelling devices are widely spaced throughout the vineyard. Each has a length much shorter than the distance between adjacent vineyard poles, the length being sufficient to allow a bird to land. The bird repelling devices have a circumference less than approximately one and one-half inch to allow the feet of a bird landing thereon to cover most of its circumference. Each bird repelling device is composed of an elongate insulating member and an electrically conductive rod secured to it. The rod is substantially as long as the elongate insulating member. A high voltage is applied to each electrically conductive rod. Each of the elongate insulating members is secured to a portion of the trellis wires parallel to the trellis wires. A bird landing on a bird repelling device completes a circuit between the trellis wire and the electrically conductive rod carried by that bird repelling device. This shocks the bird without substantially harming it so that the bird flies away. Mounting fixtures mounted on vineyard poles at the ends of rows readily accepts, holds, and automatically makes electrical contact with modified bird repelling devices.

Our prior art search with abstracts described above teaches: an animal training system, an apparatus for discouraging animals from a selected area, a method and apparatus for confining animals, a pest repelling apparatus and methods, a sea bird marine craft protector, an electric cattle guard, a pest bird control, a bird repelling system with improved mounting fixture, and a locking vehicle cover, but does not teach a cover with cross stitching wherein one set of the stitching is at a high voltage while another set of the stitching is at a lower voltage or at ground potential so that touching the cover yields a shock. The present invention fulfill the need for a low cost flexible cover that may be cut to fit around and over objects but maintains its shock producing surface although cut.

SUMMARY OF THE INVENTION

The present invention teaches certain benefits in construction and use which give rise to the objectives described below.

The invention is a flexible fabric blanket of plural layers including a bottom insulating layer, a base electrically conductive layer, a medial insulating layer, a medial electrically conductive layer, and a top insulating layer. A first set of electrically conductive stitchings extend between the medial electrically conductive layer, and the top insulating layer and are exposed on an exterior surface of the top insulating layer. A second set of electrically conductive stitchings extend between the base electrically conductive layer, and the top insulating layer and are also exposed on an exterior surface of the top insulating layer, but do not touch the medial electrically conductive layer. The method of preparing the electrified flexible fabric blanket comprises the steps of sewing the first set of electrically conductive stitchings into the medial electrically conductive layer, and the top insulating layer; placing the medial insulating layer against the medial electrically conductive layer, the base electrically conductive layer against the medial insulating layer and the bottom insulating layer against the base electrically conductive layer; sewing the second set of electrically conductive stitchings into the blanket, the second set of stitchings extending from the top insulating layer to the bottom insulating layer and positioned to avoid touching the medial electrically conductive layer; and thereby exposing the first and second set of stitchings in mutual adjacency, but not touching, on the exterior surface of the top insulating layer. When a bird or other animal touches the stitches on the top insulating layer it receives a small electrical shock, or tingle, and is therefore not able to land on this surface. In this manner, the animal is less likely to leave excrement on the surface.

A primary objective of the present invention is to provide an apparatus and method of use of such apparatus that yields advantages not taught by the prior art.

Another objective is to provide such an invention capable of being fabricated at a very low cost.

A further objective is to provide such an invention capable of providing voltage across stitches placed at any selected spacing.

A still further objective is to provide such an invention capable of being cut to fit an application, including having a portion cut out from the fabric, while yet maintaining its electrical potential over all of the remaining outfacing surface.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 5:
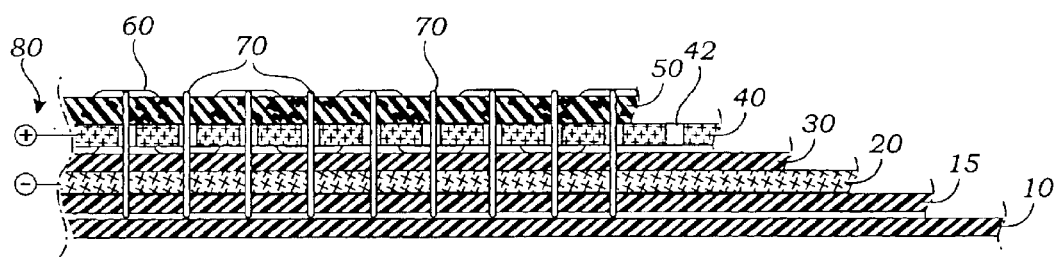
FIG. 5 is a elevational sectional view taken along line 5—5 in FIG. 2 showing a six layer structure thereof.

The present invention is a cover apparatus comprising a flexible fabric blanket made up of plural layers of materials that are stitched or otherwise fabricated together as a single unit. The blanket is electrified so that both positive and negative electrical potentials exist on an outer surface. Such a blanket is ideally useful for repelling birds from boats and ships, both at slip and dry-dock. Preferably included, as shown in FIG. 5, are a bottom insulating layer 10, a base electrically conductive layer 20, a medial insulating layer 30, a medial electrically conductive layer 40, and a top insulating layer 50. These are the minimal layers necessary to complete the electrical function of the blanket, but other layers may also be included, as for instance layer 15, for adding strength, rigidity or other characteristics to the blanket. Preferably, the insulating layers 10, 30 are continuous sheets of insulating plastic such as polypropylene or polyester, and insulating layer 50 is a flexible grade of nautical canvas or equivalent material such as rip-stop nylon cloth or woven polypropylene cloth. The electrically conductive layers 20 and 40 are preferably woven fabric cloths made using a thread that contains at least one metallic fiber. Such threads are well known in the field and are usually made of a natural or synthetic fiber that has a thin electroplated coating on its exterior surface. Alternately, a solid metal wire of light gauge may be used or a twisted strand metal wire can be used. In the present application a relatively high voltage is applied to at least one of the conductive layers 20, 40, however, since no appreciable or sustained current is caused to flow, the amount of conductive metal in the fabric may be quite small and this enables the blanket to be highly flexible so as to be folded easily and tied about objects such as those found on a boat or ship.

Figure 3:
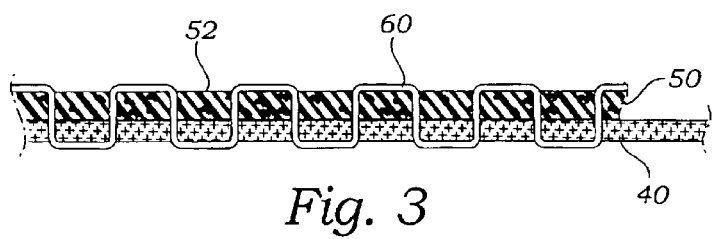
FIG. 3 is an elevational sectional view taken along line 3—3 in FIG. 2 showing only the top two layers thereof.

A first set of electrically conductive stitchings 60 extends between the medial electrically conductive layer 40 and the top insulating layer 50, as shown in FIG. 3, and are therefore exposed on an exterior surface 52 of the top insulating layer 50. A second set of electrically conductive stitchings 70 extends between the base electrically conductive layer 20 and the top insulating layer 50, the second set of stitchings 70 being also exposed on the exterior surface 52 of the top insulating layer 50. Preferably, the top insulating layer 50 is a nautical canvas or similar water impermeable and physically tough material.

The nautical canvas or other tough material may preferably or in addition, be placed between the bottom insulating layer 10 and the base electrically conductive layer 20, i.e., layer 15 in FIG. 3, and the second set of stitchings 70 may extend into this layer as shown. The stitchings 60, 70 are made with a thread that is metallic or contains a metallic component, as previously described. When these stitchings are then sewn into the blanket, electrical contact is made between the stitchings 60, 70 and the conductive fabric layers 40, 20 respectively, and while stitching 60 contacts only layer 40, stitching 70 contacts only layer 20, so that an electrical potential difference is able to be maintained on surface 52.

Figure 2:
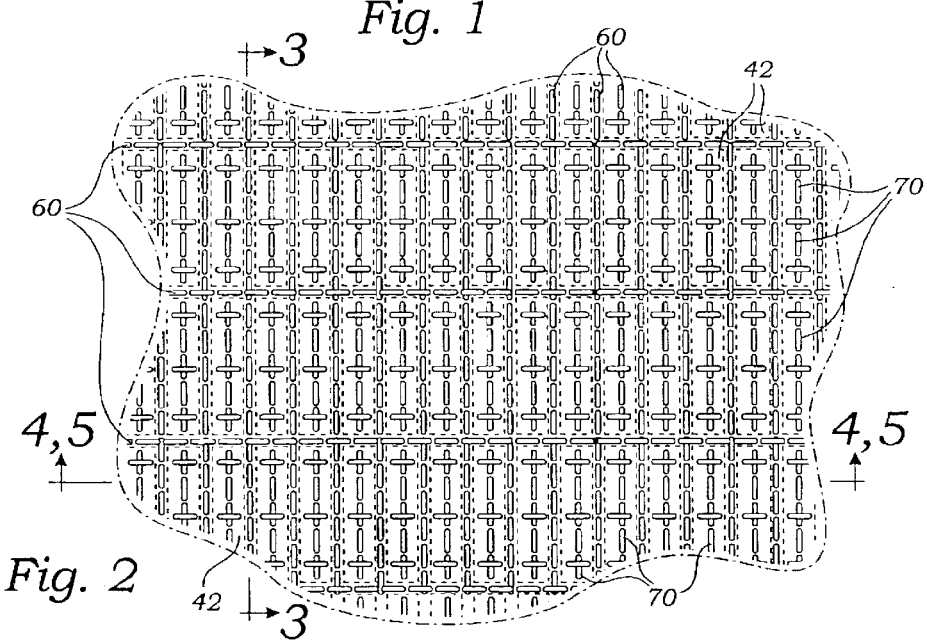
FIG. 2 is a plan view of a portion thereof showing further detail of the manner in which the apparatus is stitched.

Necessarily, the medial electrically conductive layer 40 is formed with a network of spaces 42 therein, and the second set of stitchings 70 are positioned to extend through the network of spaces 42 in the medial conductive layer 40. This is clearly shown in FIG. 2 where the dashed lines define the outline of the medial conductive layer or fabric. It is seen here, that the second set of stitchings 70 is placed to avoid contact with the medial conductive layer 40.

Figure 1:
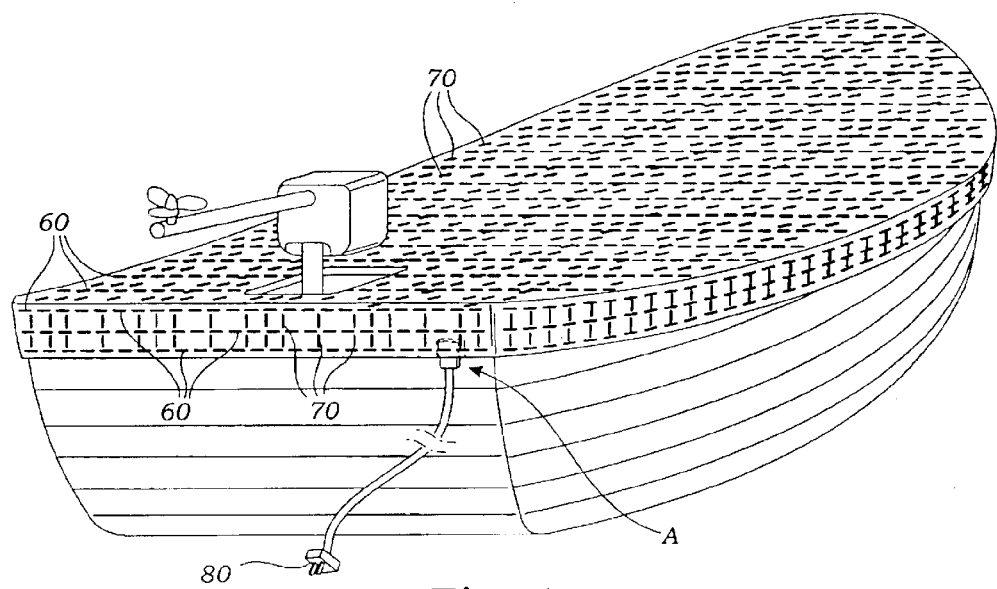
FIG. 1 is a perspective view of the present invention as mounted on a small boat.

Preferably, a means for applying an electrical voltage 80 to the electrically conductive layers 20, 40 is provided. Preferably, the voltage means 80 comprises a utility outlet plug and cord set which is electrically interconnected to the layers 20, 40. In the preferred embodiment, 60 or 50 Hz alternating current from mains is dropped down to a voltage not exceeding about 40 volts RMS and is then applied to the blanket through connections at point "A" as shown in FIG. 1. Such an AC voltage is able to shock a bird or other animal but is not lethal.

In this manner a potential difference is applied to the layers 20, 40 so that the stitches that appear on the outside surface 52 of the top insulating layer 50 take the electrical potential of the respective layer into which they are sewn. Since an alternating current will tend to move through tissue more easily than a steady, or direct, current, it is a preference of the present invention that the applied potential difference be one of an alternating voltage. If set apart at a spacing that insures that an animal coming into contact with the outside surface of the top insulating layer 50, will touch at least one of each of the stitches of stitchings 60 and 70, an electrical shock will be administered to the animal.

The voltage applying means as described above is preferably connected to a power source such as a common utility AC and the voltage means 80 preferably includes a step down transformer to apply only enough voltage as necessary to shock a bird or other animal so that the blanket stays clean.

Figure 4:
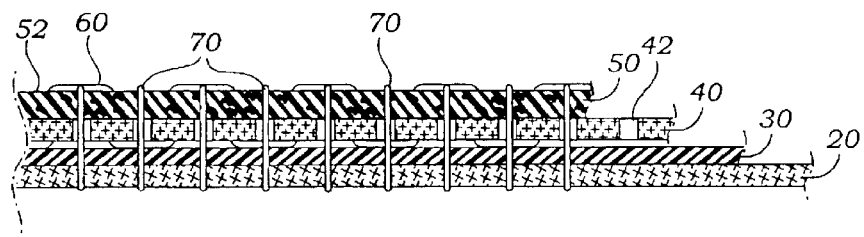
FIG. 4 is an elevational sectional view taken along line 4—4 in FIG. 2 showing the top five layers thereof.

The method of preparing the electrified flexible fabric blanket comprises the steps of first sewing the first set of electrically conductive stitchings 60 into the medial electrically conductive layer 40 through the top insulating layer 50, as shown in FIG. 3. This is followed by placing the medial insulating layer 30 against the medial electrically conductive layer 40, and the base electrically conductive layer 20 against the medial insulating layer 30, as shown in FIG. 4. At this point, the second set of electrically conductive stitchings 70 is sewn into the blanket. Alternately, an insulating layer 15 may be also sewn into the blanket at this time.

Finally, the bottom insulating layer 10 is placed with all of the other layers above it, and this layer may be sewn using a non-metallic thread or bonded to the blanket as would be known by those of skill in the art. This is shown in FIG. 5.

Preferably, the medial electrically conductive layer 40 is a network having spaces 42 therein so that the second set of stitchings 70 is able to penetrate the blanket without causing an electrical short between the two electrically conductive layers 20 and 40.

After the blanket has been placed onto or over the object to be protected, an alternating voltage is applied to the conductive layers 20 and 40 and therefrom, to the conductive stitches 60 and 70 that are exposed on surface 52.

FIG. 1 shows that a portion of the blanket may be cut or a hole may be cut out of the blanket without losing voltage to the surface of the rest of the blanket. This is possible because all of the stitches receive voltage from the underlying conductive layers which are an X, Y network of conductive threads. Unless the blanket is severed, all of the stitches 60, 70 will remain in electrical continuity with the source of voltage no matter how the blanket is cut up.

The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments below or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A cover apparatus comprising: a flexible fabric blanket of plural layers including a bottom insulating layer, a base electrically conductive layer, a medial insulating layer, a medial electrically conductive layer, and a top insulating layer; a first set of electrically conductive stitchings extending between the medial electrically conductive layer, and the top insulating layer, the first set of stitchings exposed on an exterior surface of the top insulating layer; a second set of electrically conductive stitchings extending between the base electrically conductive layer, and the top insulating layer, the second set of stitchings exposed on an exterior surface of the top insulating layer.

2. The apparatus of claim 1 wherein the top insulating layer is a nautical canvas.

3. The apparatus of claim 1 further comprising a layer of nautical canvas between the bottom insulating layer and the base electrically conductive layer, and wherein the second set of stitchings extends into the nautical canvas.

4. The apparatus of claim 1 wherein the medial electrically conductive layer is formed with a network of spaces therein, the second set of stitchings positioned to extend through the network of spaces in the medial conductive layer.

5. The apparatus of claim 1 further comprising a means for applying an electrical voltage to at least one of the base electrically conductive layer and the medial electrically conductive layer.

6. A blanket apparatus comprising: at least two electrically conductive fabric layers separated by an electrically insulating layer therebetween; a further insulating layer placed over one of the two conductive layers; first electrically conductive threads sewn through the layers into the one of the conductive layers from the further insulating layer; second electrically conductive threads sewn into the other of the conductive layers from the further insulating layer while not making contact with the one of the conductive layers; and an electrical potential difference placed on the two conductive layers and thereby to exposed stitches exterior of the further insulating layer.

7. A method of preparing an electrified flexible fabric blanket comprising the steps of: sewing a first set of electrically conductive stitchings into a medial electrically conductive layer, and a top insulating layer; placing a medial insulating layer against the medial electrically conductive layer, a base electrically conductive layer against the medial insulating layer and a bottom insulating layer against the base electrically conductive layer; sewing a second set of electrically conductive stitchings into the blanket, the second set of stitchings extending from the top insulating layer to the bottom insulating layer and positioned to avoid touching the medial electrically conductive layer; exposing the first and second set of stitchings on an exterior surface of the top insulating layer.

8. The method of claim 7 further comprising the step of forming the medial electrically conductive layer as a network having spaces therein.

9. The method of claim 7 further comprising the step of applying an electrical voltage to at least one of the base electrically conductive layer and the medial electrically conductive layer.

* * * * *